Sept. 19, 1967   F. D. HICKEY   3,342,607
METHOD OF PROCESSING CEREAL GRAIN
Filed Aug. 1, 1966
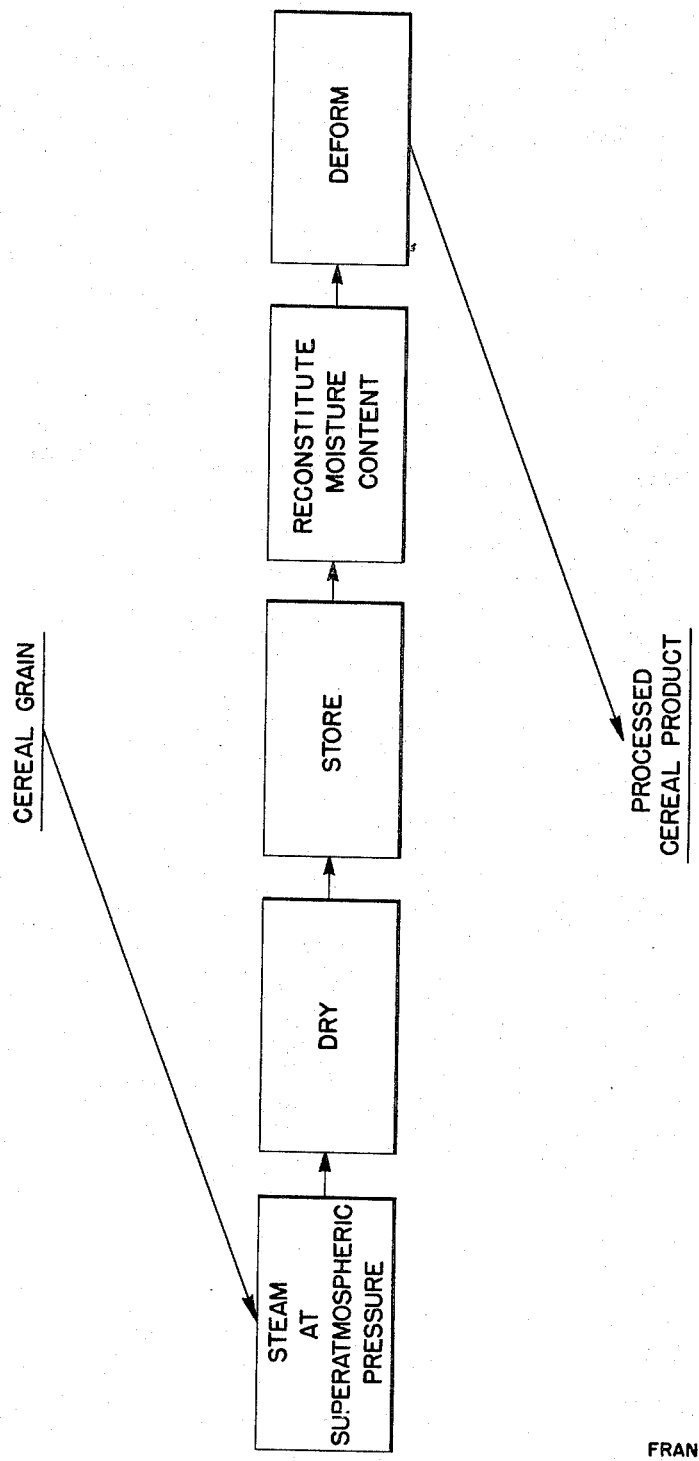
INVENTOR
FRANK D. HICKEY
BY Francis W. Anderson
ATTORNEY 3,342,607
METHOD OF PROCESSING CEREAL GRAIN
Frank D. Hickey, San Jose, Calif., assignor to FMC Corporation, San Jose, Calif., a corporation of Delaware
Filed Aug. 1, 1966, Ser. No. 569,361
6 Claims. (Cl. 99—2)

ABSTRACT OF THE DISCLOSURE

Cereal grain having a moisture content of about 9–13% by weight is processed by steaming for 4 to 7 minutes at 20–100 p.s.i.g. to increase the moisture content to 25% by weight, dried to a moisture content of 12–13%, reconstituted by steaming to increase its moisture content to about 15–25% and flaked.

---

This application is a continuation-in-part of my copending application Ser. No. 448,568, filed Apr. 8, 1965, which in turn is a continuation of my application Ser. No. 340,288, filed Jan. 27, 1964, and now abandoned.

This invention relates to a method of processing cereal grain. More particularly, this invention concerns a method of preparing cereal grain to enhance enzymatic conversion of its starch to dextrose, and generally comprises cooking the grain with steam, drying and storing it, steaming it to restore its moisture content, and then rolling or otherwise deforming it to disorganize its cell tissue structure.

In many uses of cereal grain, the carbohydrate material in the grain is acted upon by enzymes to convert these carbohydrates to dextrose. In the feeding of livestock, for example, the enzymes secreted by the organisms in the rumen and intestine of the animal act on the carbohydrates in cereal grain to convert them to a readily metabolizable form. Similarly, in the brewing and distilling art, cereal grain is brewed and enzymes are added to convert the starch into dextrin and sugar in the formation of alcohol.

It has been found that the ability of enzymes to convert cereal grain carbohydrates to dextrose can be increased to an unexpected degree by first processing the grain under certain pressurized cooking conditions. Since the amount of value derived from cereal grain depends upon the ability of enzymes to convert the carbohydrates in the grain to nutrients such as dextrose, any increase in the effective action of the enzymes will result in a more efficient use of the grain. Thus, if cereal grain is processed so that the enzymes in an animal's digestive system can increase the amount of nutrients available for metabolism purposes while the grain is passing through the system, the amount of grain converted to added weight of the cattle is increased proportionately.

Cooking cereal grain with steam for extensive periods of time, such as from 25 to 40 minutes, has previously been proposed on the assumption that if the cooking was carried on long enough the starch in the grain would be converted into sugar. Such a process has never been commercially successful, presumably because the cost of the lengthy heating would offset in part the gain that would result if the cereals were made more digestible. It also has been proposed to prepare cereal by steaming it for a shorter period of time under slightly elevated pressures, but the results of this treatment indicate that the quantity of dextrose or dextrin made available is not appreciably greater than that resulting from steaming at longer times under atmospheric pressure. Thus, whether the cereal grain is fed to animals in a raw condition or is first steamed at atmospheric or slightly elevated pressure makes no appreciable difference in the nutritive value of the cereal in terms of readily metabolizable dextrose.

In my aforementioned copending application Ser. No. 448,568, I have disclosed and claimed a method for processing cereal grain that involves steaming it for from about 15 seconds to 5 minutes at pressures of from about 20 to 100 p.s.i.g. and then flaking or otherwise deforming it. That method is designed primarily for processing the grain just before it is used, such as for animal feed, and produces an unexpected increase in the amount of dextrose that is released from the grain when it is subjected to enzymatic action.

However, there are occasions when it is desirable to process the grain considerably in advance of the time it is to be used and then place it in storage until that time arrives. When grain is cooked and flaked in accordance with the above process, its bulk density is decreased up to 50 percent, as for example when milo is so processed its bulk density drops from about 50 to about 25 pounds per cubic foot. Thus fully processed grain requires up to twice as much storage space, an expensive and, on occasion, scarce item. On the other hand, it has been thought that if the grain is cooked and then dried and stored before it is subjected to the flaking step it would grind rather than flake since cooking alters the structure of the grain and causes the main long-chained starch molecules to break down.

Accordingly, one of the objects of the present invention is to improve my aforementioned earlier method of processing cereal grain so that the grain can be cooked and stored, even for an extended time, before it is flaked or otherwise deformed.

Another object of the present invention is to provide an improved method for processing cereal grain to enhance the enzymatic conversion of starch in the grain into dextrose.

Another object of the present invention is to provide an improved method for conditioning cereal grain to increase the rate at which it can be digested.

Yet another object of the present invention is to provide a new cereal grain product having unexpectedly superior nutritional properties.

These and other objects of the present invention will become apparent from the following description, and from the accompanying drawing which illustrates the several steps of the method of the invention in schematic flow-chart form.

Broadly considered, as indicated by the drawing, the method of the present invention comprises cooking cereal grain with steam at superatmospheric pressure, drying the grain, storing it, steaming the grain to reconstitute its moisture content, and then deforming the grain to disorganize its cell structure. During this series of steps the large starch molecules are broken down into smaller molecules and the permeability of the walls of the grain cells is increased, facilitating enzymatic extraction of and reaction with the nutritional components of the cereal product, such as when it is acted upon by enzymes and juices in an animal's digestive tract or by enzymes used in the brewing industry. The result is a unique cereal product that provides more nutrition, i.e., has more useable food content, than the product of grain processed by other known methods.

The conditions under which the method of this invention is performed may be varied within certain ranges. For example, the grain may be cooked at pressures of about 2 to 100 p.s.i.g., and for time periods of about 15 seconds to 5 minutes, so long as the cooked grain contains no more than 25 percent moisture by weight. The grain may be dried under normal atmospheric conditions or in a special dehydrating atmosphere until its moisture content is reduced to about 12 to 13 percent by weight. A cool and dry atmosphere is preferred for storing the grain, but other conditions may be more acceptable for certain situations.

Reconstitution of the grain's moisture content is accomplished by steaming it at atmospheric pressure until it contains from about 15 to 25 percent moisture by weight. As an illustration, this may require around 4 minutes with corn, wheat, barley and oats, and around 7 minutes for milo.

Deforming the cooked and reconstituted grain is achieved in the same manner as disclosed in my aforementioned application Ser. No. 448,568. As stated therein, this can be by rolling the grain to flake it, by crushing it, flattening it, or by any other stressing action that substantially disorganizes the cell walls and makes them more permeable to enzymes and other digestive juices. Rolling to form flakes, i.e., "flaking," is the preferred deforming procedure.

The process of this invention is designed for cereal grain with a normal moisture content. By the term "normal moisture content" is meant the amount of moisture in the cereal grain when it is exposed to the usual ambient weather conditions. As an example, the normal moisture content of corn and milo may be in the range of from about 9 to 13 percent by weight, although it may be less in dry climates.

In order to more fully disclose the invention, and to point out some of the highly favorable and unexpected results that are achieved when various cereal grains are processed according to it, several cereals were processed at a variety of temperature and pressure conditions, and the results thereof are set forth as examples below. It is to be understood, however, that these examples are illustrative only, and are not in any sense to be construed as limiting upon the scope of the invention. Operating at other conditions within the foregoing specified ranges also is, of course, within the scope of the invention and will produce comparable beneficial results.

*Example I*

A sample of milo of normal moisture content was cooked with steam at 60 p.s.i.g. for 1½ minutes, dried until its moisture content was about 12.5 percent by weight, and then stored at atmospheric conditions for one year. The grain then was reconstituted to about 16.5 percent moisture by weight by steaming it for seven minutes at 212° F., and then cooled to 155° F. and flaked by passing it between a pair of rollers. No problems were encountered in the flaking operation, and the flakes were whole and of top quality.

To determine how much dextrose could be obtained from these flakes and thus their nutritional value, they were ground and then digested in a diastase medium. At the end of each hour, refractometer readings of the solution were taken to measure the dextrose content. The results are set forth in column A in the following Table I. For comparison, Table I also includes, in column B, the results of the same test on milo flakes formed immediately after cooking with steam at 60 p.s.i.g. for 2½ minutes, i.e., according to the process of my earlier application Ser. No. 448,568, and, in column C, on milo flakes formed immediately after cooking with steam at atmospheric pressure for 10 minutes, i.e., a conventional process of the industry.

TABLE I.—ANALYSIS OF GROUND MILO FLAKES
[Milligrams of dextrose per gram of sample]

| Hours Digested | A | B | C |
|---|---|---|---|
| 1 | 368 | 245 | 15 |
| 2 | 464 | 330 | 22 |
| 3 | 482 | 390 | 22 |
| 4 | 505 | 425 | 22 |

Similar unexpected enhancement of dextrose release occurs when other cereal grain, such as corn, wheat, barley, and oats, is substituted for milo in the above procedure.

*Example II*

To further illustrate the unexpected beneficial results achieved by practicing the present invention, four samples, one each of corn, wheat, barley and oats, were steam cooked at 60 p.s.i.g. for two minutes and each then divided into three portions. One portion of each sample was submitted directly to diastase digestion, i.e., the grain was whole, not flaked or otherwise deformed. Another portion of each sample was flaked and the flakes subjected to the action of diastase. The remaining portion of each sample was dried at atmospheric conditions for 36 hours, reconstituted in a batch retort with atmospheric steam for four minutes, flaked, and then subjected to diastase digestion. For comparison, samples of each of the four grains in the raw, i.e., uncooked, state also were tested with diastase. All digestions were carried out for four hours. The results are set forth in the following Table II.

TABLE II.—FOUR HOUR DIASTASE DIGESTION
[Mg. dextrose per gm. sample]

| Grain | Raw | Cooked Whole | Cooked and Flaked | Cooked, Dried, Reconstituted and Flaked |
|---|---|---|---|---|
| Corn | 136 | 288 | 528 | 536 |
| Wheat | 144 | 528 | 648 | 688 |
| Barley | 128 | 448 | 532 | 584 |
| Oats | 136 | 376 | 408 | 440 |

Moisture data on the above samples was gathered at various stages of their processing. This information is set forth in the following Table III.

TABLE III.—MOISTURE (WT. PERCENT)

| | Corn | Wheat | Barley | Oats |
|---|---|---|---|---|
| Raw Whole Grain | 14.0 | 11.4 | 12.0 | 11.2 |
| Whole Grain after Cooking | 18.5 | 16.8 | 17.9 | 19.6 |
| Whole Grain after Cooking and Drying | 12.5 | 12.8 | 12.0 | 12.0 |
| Whole Grain after Cooking, Drying and Reconstituting | 20.3 | 20.2 | 17.9 | 17.3 |

The preferred apparatus for cooking the grain according to the present invention is the pressure vessel or cooker that is disclosed and claimed in my aforementioned application Ser. No. 448,568, and also in my U.S. Patent No. 3,243,264, which issued Mar. 29, 1966. This vessel includes an elongate cylindrical housing in which a rotatable, auger type conveying element is mounted to move the grain through the housing at a predetermined rate. The grain is introduced into the housing through a rotor-type pressure valve, such as that disclosed in U.S. Patent No. 2,638,137 to De Back, and is removed from the housing through another valve of this type, both valves serving also to prevent loss of the elevated pressure in the housing. Steam under the desired pressure is circulated through the housing to cook the grain as it passes through.

The cooked grain may be dried in any of a variety of ways, such as in open containers, well known to those skilled in this art, and may be stored in any suitable container or manner, preferably in a cool and dry atmosphere.

Reconstitution of the cooked and dried grain can be carried out in either an open or closed container, so long as it can be steamed adequately. Containers of these types are readily available and well known. A Memco roller mill, marketed by Mill Engineering and Machinery Company of Oakland, Calif., a device having a pair of rollers 18 inches in diameter and 30 inches long and mounted for adjustment toward or away from each other, has been found very satisfactory for deforming the reconstituted grain into flakes, though other devices well-known in this art also are adequate to deform the grain properly.

As will be readily apparent to those skilled in this art, there are several advantages in processing grain according to this invention. For instance, cooking the grain with steam at about 20 p.s.i.g. pressure or above eliminates the need for water in cooking, and also the need to soak the grain before it is cooked as has always been the common practice in the past. This process also more thoroughly cooks the starch in the grain, and results in a more digestible product. This digestibility increase means that when the grain is used as animal feed, it is assimilated more completely by the animal, as is clearly evidenced by reduction of the "passthrough" of uncooked starches that is common when grain is processed under atmospheric pressure.

The fact that the cooked cereal grain can be dried, stored for as much as a year or more, and then reconstituted, all before it is deformed is unexpected in view of the current understanding of the structure and reactions of cereal grain. Normally, one would expect that drying the cooked grain would restrict the subsequent conversion of starch to dextrose, and that whatever conversion did occur would be much less than in grain which had been cooked and then deformed without intermediate drying. Yet, as shown in Tables I and II above, just the opposite is true. Furthermore, drying the grain before deforming would be expected to alter its structure so that it would not flake after reconstitution yet such grain flakes very well.

Another advantage of processing grain according to this invention is that the rolled product contains fewer fines than that from grain steamed at atmospheric conditions, as production results have shown. The volume of fines in atmospherically processed grain constitutes a substantial loss of feed in subsequent handling and feeding operations. It has been established that fines can be the cause of respiratory trouble in animals, so that a reduction of fines is advantageous here as well.

It will be understood that modifications and variations may be effected without departing from the spirit of the present invention which is limited solely by the scope and proper interpretation of the appended claims.

Having thus described my invention, what I claim as new and desire to protect by Letters Patent is:

1. A method of processing cereal grain comprising the steps of cooking the grain at its normal initial moisture content of from about 9 to 13 percent by weight with steam at superatmospheric pressure of at least about 20 p.s.i.g. for a time sufficient to raise the moisture content of the grain to not more than 25 percent by weight, drying the cooked grain to reduce its moisture content to not more than about 13 percent by weight, reconstituting the dried grain by steaming it to increase its moisture content from about 15 percent to 25 percent by weight and convert it into a pliable condition, and deforming the reconstituted grain before it has cooled to ambient temperature to disorganize its tissue structure and enhance enzymatic conversion of its starch into dextrose.

2. The method of claim 1 wherein the grain is cooked for from about 15 seconds to 5 minutes.

3. The method of claim 2 wherein the dried grain is reconstituted by steaming it for from about 4 to 7 minutes.

4. The method of claim 1 wherein the grain is deformed by passing it between rollers to form flakes.

5. The method of claim 1 wherein the grain is deformed by crushing.

6. The method of claim 1 wherein the grain is deformed by grinding.

References Cited
UNITED STATES PATENTS

| | | | |
|---|---|---|---|
| 172,863 | 1/1876 | Beach | 99—2 |
| 174,346 | 3/1876 | Beach | 99—2 |
| 1,321,754 | 11/1919 | Kellogg | 99—81 |

RAYMOND N. JONES, *Primary Examiner.*

UNITED STATES PATENT OFFICE
CERTIFICATE OF CORRECTION

Patent No. 3,342,607 September 19, 1967

Frank D. Hickey

It is certified that error appears in the above identified patent and that said Letters Patent are hereby corrected as shown below:

Column 2, line 64, "2" should read -- 20 --.

Signed and sealed this 16th day of September 1969.

(SEAL)
Attest:

Edward M. Fletcher, Jr.            WILLIAM E. SCHUYLER, JR.

Attesting Officer                  Commissioner of Patents